United States Patent [19]
Buckler et al.

[11] 3,843,710
[45] Oct. 22, 1974

[54] SUBSTITUTED BETA-ARYLAMIDOACRYLIC ACIDS

[75] Inventors: Robert Thomas Buckler, Edwardsburg, Mich.; Harold Eugene Hartzler, Elkhart, Ind.

[73] Assignee: Miles Laboratories, Inc., Elkhart, Ind.

[22] Filed: Feb. 15, 1973

[21] Appl. No.: 332,805

Related U.S. Application Data

[62] Division of Ser. No. 81,622, Oct. 16, 1970, Pat. No. 3,770,821.

[52] U.S. Cl. .................. 260/465 D, 260/295 AM, 260/295.5 A, 260/471 A, 260/482 R, 260/518 A, 260/518 R, 424/263, 424/304, 424/319

[51] Int. Cl. .......................................... C07c 121/78
[58] Field of Search ............................... 260/465 D

[56] References Cited
OTHER PUBLICATIONS

Barker: J. Chem. Soc., pp. 317–319, (1954).

*Primary Examiner*—Lewis Gotts
*Assistant Examiner*—Dolph H. Torrence

[57] ABSTRACT

Certain substituted β-arylamidoacrylic acids and a method of preparing them are disclosed. These compounds are useful as antiinflammatory and diuretic agents.

2 Claims, No Drawings

SUBSTITUTED BETA-ARYLAMIDOACRYLIC ACIDS

This is division of application Ser. No. 81,622 filed Oct. 16, 1970, now U.S. Pat. No. 3,770,821.

SUMMARY OF THE INVENTION

Compounds of the present invention correspond to the formula

A 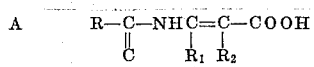

in which R is phenyl, halophenyl, loweralkylphenyl, cyanophenyl, loweralkoxyphenyl, diloweralkylaminophenyl or pyridyl; $R_1$ is loweralkyl or phenyl and $R_2$ is hydrogen or loweralkyl. The term "halophenyl" includes a phenyl radical substituted by from one to three halogen atoms such as bromine, iodine, chlorine and fluorine. The terms "loweralkyl" and "loweralkoxy" include alkyl and alkoxy radicals containing from 1 to 4 carbon atoms, inclusive. These compounds possess both antiinflammatory and diuretic properties. When orally administered to animals at a dosage of one millimole per kilogram of body weight, the antiinflammatory effect is observed as a significant reduction in the effusive response to intrapleural injection of Evans Blue: Carrageenin.

Compounds included within the scope of this invention can be prepared as shown below wherein R, $R_1$ and $R_2$ are as previously defined and $R_3$ is methyl or ethyl:

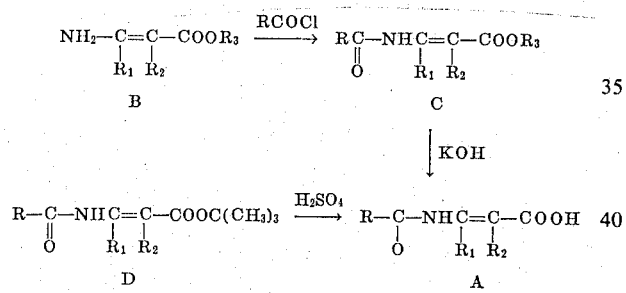

Thus, the esters of formula B are acylated with an R-substituted acid chloride according to the known procedure described in Berichte, 42, 3912 (1910) to yield the β-arylamidoacrylate esters of formula C which are carefully saponified with aqueous potassium hydroxide in isopropanol to produce the desired products of formula A as crystalline solids soluble in alkali. Alternatively, the t-butyl esters of formula D can be hydrolyzed by dissolving them in sulfuric acid and pouring the resulting solution over crushed ice to obtain the desired β-arylamidoacrylic acids. Specific embodiments of both procedures are set forth in the examples which follow.

PREFERRED EMBODIMENTS

EXAMPLE 1

$R_1$ and $R_2$ are methyl and R is p-methoxyphenyl in formula A.

A suspension of 35 grams (0.13 mole) of ethyl β-(p-methoxybenzoylamino)-α-methylcrotonate (melting at 97°C.) in 150 ml. of 66 percent aqueous isopropanol containing 8.65 grams (0.13 mole) of 85 percent potassium hydroxide was stirred at room temperature for 24 hours. The yellow solution which formed was filtered and diluted with 3 liters of hot water and 40 ml. of acetic acid. The precipitate was collected, dried and recrystallized from methanol to give 19 grams of β-(p-methoxybenzoylamino)-α-methylcrotonic acid as a white solid which melted at 150°C. and contained 5.53 percent nitrogen versus the calculated value of 5.62 percent nitrogen.

EXAMPLE 2

$R_1$ is methyl, $R_2$ is hydrogen and R is 3,4-dichlorophenyl in formula A.

A solution of 6.6 grams (0.02 mole) of t-butyl-β-(3,4-dichlorobenzoylamino)crotonate (melting point = 102°C.) in 50 ml. of 98 percent sulfuric acid was allowed to stand for 3 hours at room temperature and then poured over crushed ice. The solid which formed was collected, dried and suspended in one liter of boiling water for 5 minutes, then cooled and filtered. Upon recrystallization from benzene, there was obtained 0.6 gram of β-(3,4-dichlorobenzoylamino) crotonic acid as a white solid with a melting point of 167°C. This compound analyzed 5.20 percent nitrogen compared to 5.11 percent nitrogen calculated.

EXAMPLE 3

$R_1$ is phenyl, $R_2$ is hydrogen and R is phenyl in formula A.

A solution of 27 grams (0.092 mole) of ethyl β-benzamidocinnamate (b.p. = 195°C. at 0.5 mm. pressure) in 300 ml. of 66 percent aqueous isopropanol containing 6 grams of 85 percent potassium hydroxide was stirred for 24 hours at room temperature. The isopropanol was then removed under vacuum and the residue diluted with water. The insoluble material which formed was filtered and the filtrate acidified to produce the desired β-benzamidocinnamic acid as a white solid melting at 152°C. The yield was 14 grams or 57 percent of theory. Upon analysis, the acid product was found to contain 5.02 percent nitrogen compared to the calculated value of 5.24 percent nitrogen.

EXAMPLES 4 – 14

By following the saponification procedure described in Example 1, other compounds of formula A were prepared in which $R_1$ was always methyl, $R_2$ was always hydrogen and R was as shown in the table below:

| EXAMPLE NO. | R | M.P. °C. | % NITROGEN Calc. | Found | % YIELD |
|---|---|---|---|---|---|
| 4 | 4-fluorophenyl | 155 | 6.28 | 6.18 | 34 |
| 5 | 3-chlorophenyl | 146 | 5.84 | 5.72 | 23 |
| 6 | 4-chlorophenyl | 149 | 5.84 | 6.06 | 5 |
| 7 | 4-bromophenyl | 164 | 4.93 | 4.84 | 7 |
| 8 | 4-methylphenyl | 150 | 6.39 | 6.29 | 37 |
| 9 | 4-ethylphenyl | 111 | 6.00 | 5.82 | 11 |
| 10 | 4-isopropylphenyl | 114 | 5.67 | 5.77 | 12 |
| 11 | 4-t-butylphenyl | 136 | 5.36 | 5.21 | 15 |
| 12 | 4-cyanophenyl | 177 | 12.17 | 12.21 | 2 |
| 13 | 4-methoxyphenyl | 147 | 5.95 | 5.71 | 13 |
| 14 | 4-dimethylaminophenyl | 142 | 11.28 | 11.32 | 37 |

The starting crotonate esters employed in the foregoing examples were as follows:

| EXAMPLE NO. | STARTING CROTONATE ESTER | M.P. °C. |
|---|---|---|
| 4 | ethyl β-(4-fluorobenzamido)- | 102 |
| 5 | methyl β-(3-chlorobenzamido)- | 87 |
| 6 | methyl β-(4-chlorobenzamido)- | 135 |
| 7 | methyl β-(4-bromobenzamido)- | 168 |
| 8 | ethyl β-(4-methylbenzamido)- | 66 |
| 9 | methyl β-(4-ethylbenzamido)- | 153 |
| 10 | methyl β-(4-isopropylbenzamido)- | 178* |
| 11 | ethyl β-(4-t-butylbenzamido)- | 74 |
| 12 | methyl β-(4-cyanobenzamido)- | 173 |
| 13 | methyl β-(4-methoxybenzamido)- | 111 |
| 14 | methyl β-(4-dimethylaminobenzamido)- | 117 |

*(b.p. at 1 mm.)

EXAMPLES 15 – 24

In the same manner as that described in Example 1, still other compounds corresponding to formula A were prepared in which $R_1$ and $R_2$ were always methyl and R in each example was varied as shown in the following table:

| EXAMPLE NO. | R | M.P. °C | % NITROGEN Calc. | Found | % YIELD |
|---|---|---|---|---|---|
| 15 | phenyl | 155 | 6.39 | 6.25 | 47 |
| 16 | 4-chlorophenyl | 171 | 5.52 | 5.36 | 21 |
| 17 | 3,4-dichlorophenyl | 183 | 4.86 | 4.86 | 44 |
| 18 | 3,-bromophenyl | 172 | 4.70 | 4.35 | 37 |
| 19 | 3,5-dibromophenyl | 182 | 3.72 | 3.75 | 22 |
| 20 | 3-iodophenyl | 171 | 4.06 | 4.05 | 52 |
| 21 | 4-iodophenyl | 184 | 4.06 | 4.10 | 57 |
| 22 | 4-pyridyl | 170 | 12.72 | 12.45 | 19 |
| 23 | 4-isopropylphenyl | 141 | 5.36 | 5.30 | 36 |
| 24 | 4-t-burylphenyl | 167 | 5.09 | 4.96 | 40 |

The starting α-methylcrotonate esters used in the previous examples were as follows:

| EXAMPLE NO. | STARTING α-METHYLCROTONATE ESTER | M.P. °C. |
|---|---|---|
| 15 | ethyl β-benzamido- | 96 |
| 16 | ethyl β-(4-chlorobenzamido)- | 128 |
| 17 | ethyl β-(3,4-dichlorobenzamido)- | 146 |
| 18 | ethyl β-(3-bromobenzamido)- | 105 |
| 19 | ethyl β-(3,5-dibromobenzamido)- | 99 |
| 20 | ethyl β-(3-iodobenzamido)- | 105 |
| 21 | ethyl β-(4-iodobenzamido)- | 128 |

-Continued

| EXAMPLE NO. | STARTING α-METHYLCROTONATE ESTER | M.P. °C. |
|---|---|---|
| 22 | ethyl β-isonicotinoyl- | 139 |
| 23 | ethyl β-(4-isopropylbenzamido)- | 61 |
| 24 | ethyl β-(4-t-butylbenzamido)- | 92 |

EXAMPLES 25 – 27

By saponifying ethyl β-benzamido-α-ethylcrotonate (melting at 75° C.) as shown in Example 1, the compound of formula A wherein $R_1$ was methyl, $R_2$ was ethyl and R was phenyl was readily obtained in 37 percent yield as a crystalline solid with a melting point of 127°C. and a nitrogen content of 5.97 percent compared to 6.01 percent nitrogen calculated.

Similarly, the saponification of ethyl β-(4-bromobenzamido)-α-ethylcrotonate (melting point = 83° C.) with aqueous KOH in isopropanol produced a 5 percent yield of the compound of formula A in which $R_1$ was methyl, $R_2$ was ethyl and R was 4-bromophenyl. Said compound melted at 150° C. and contained 4.40 percent nitrogen whereas the calculated value was 4.49 percent nitrogen.

Likewise, saponification of ethyl α-ethyl-β-(4-isopropylbenzamido)crotonate produced a 33 percent yield of the compound of formula A wherein $R_1$ was methyl, $R_2$ was ethyl and R was 4-isopropylphenyl which melted at 112°C. and upon analysis was found to contain 5.04 percent nitrogen compared to 5.09 percent nitrogen calculated.

By substituting the appropriate esters of formula C wherein $R_1$ and $R_2$ are propyl or butyl, $R_3$ is methyl or ethyl and R is 2,4,5-trichlorophenyl, 4-n-butylphenyl, 4-n-propoxyphenyl or 4-diethylaminophenyl and saponifying said esters as shown in Example 1, the corresponding acids of formula A are obtained in which $R_1$, $R_2$ and R represent the radicals designated.

What is claimed is:

1. A compound of the formula

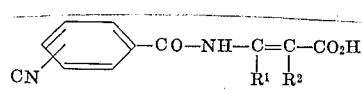

wherein:
  $R^1$ is methyl; and
  $R^2$ is hydrogen.

2. A compound as in claim 1: β-(4-cyanobenzamido)-crotonic acid.

* * * * *